United States Patent

Hyakumura

[11] 4,232,945
[45] Nov. 11, 1980

[54] PHOTOGRAPHIC CAMERA LENS SYSTEM HAVING A SHORT TOTAL LENGTH

[75] Inventor: Kazushi Hyakumura, Hachiouji, Japan

[73] Assignee: Olympus Optical Co., Ltd., Tokyo, Japan

[21] Appl. No.: 931,726

[22] Filed: Aug. 7, 1978

[30] Foreign Application Priority Data

Aug. 11, 1977 [JP] Japan .................................. 52/96274

[51] Int. Cl.³ ................................................ G02B 9/34
[52] U.S. Cl. .................................................... 350/223
[58] Field of Search ................................ 350/176, 223

[56] References Cited

U.S. PATENT DOCUMENTS 4,063,802 12/1977 Imai et al. .............................. 350/223

FOREIGN PATENT DOCUMENTS 1018236 10/1957 Fed. Rep. of Germany ........... 350/223

Primary Examiner—Paul A. Sacher
Attorney, Agent, or Firm—Cushman, Darby & Cushman

[57] ABSTRACT

A behind-stop type photographic camera lens system designed for an aperture ratio of F/2.8, a field angle of 60°, a short total length less than 0.37 f and favorably corrected aberrations, and comprising a first positive meniscus lens component, a second positive meniscus lens component, a third negative lens component, a fourth cemented lens component consisting of a biconvex lens element and a negative lens element.

4 Claims, 4 Drawing Figures

PHOTOGRAPHIC CAMERA LENS SYSTEM HAVING A SHORT TOTAL LENGTH

BACKGROUND OF THE INVENTION

1. Field of the Invention

The present invention relates to a behind-stop type photographic camera lens system designed for an aperture ratio of F/2.8, field angle of 60° and a short total length.

2. Description of the Prior Art

Almost all the conventional behind-stop type lens systems for 35 mm photographic cameras had relatively narrow field angles or, when designed for relatively wide field angles, large telephoto ratios (ratio of distance measured from the front side to the back focal point relative to focal length of lens systems), thereby prolonging their total lengths. When it is attempted to design a behind-stop type photographic camera lens system so as to have a small telephoto ratio and a wide field angle, on the other hand, marginal rays become insufficient. If lens diameter is increased to obtain sufficient marginal rays, it will be impossible to design a compact lens system. Japanese Published Examined Patent Application No. 15462/1966 and No. 26670/1971 have already disclosed photographic camera lens systems which are similar to Tesser type and comprise two positive lens components, a negative lens component and a positive cemented lens component. In these lens systems, however, the cemented surface in said positive cemented component is convex on the object side, thereby unavoidably aggravating astigmatism.

SUMMARY OF THE INVENTION

A general object of the present invention is to provide a compact lens system for photographic cameras which has an aperture ratio of F/2.8, a relatively wide field angle of 60° and a short total length of $\Sigma d < 0.37f$ and wherein various aberrations are favorably corrected.

The photographic camera lens system according to the present invention has such a composition as shown in FIG. 1, and comprises a first positive lens component having high power which is effective to design a compact lens system having a wide field angle so far unavailable and a fourth lens component having a cemented surface curved in the reverse direction as compared with the ordinary Tesser type lens so as to favorably correct various aberrations. Said lens system is therefore so designed as to favorably correct offaxial aberrations as well as curvature of astigmatism and asymmetry of coma.

The lens system according to the present invention comprises a first positive meniscus lens component, a second positive meniscus lens component, a third negative lens component and a fourth cemented lens component consisting of a biconvex lens element and a negative lens element, and is characterized in that it satisfies the following conditions:

$1.86 \leq \phi_1 + \phi_2 \leq 2.01$  (1)

$0.60 \leq \phi_1 \leq 0.86$  (2)

$1.75 \leq n_2$  (3)

$r_8 < 0$  (4)

$1.4 \leq \phi_{(67)}/\phi_{(45)} \leq 1.9$  (5)

wherein the reference symbols represent as defined below:

$r_1$ through $r_9$: radii of curvature on the respective lens elements $d_1$ through $d_8$: thicknesses of the respective lens elements and airspaces therebetween $n_1$ through $n_9$: refractive indices of the respective lens elements and airspaces therebetween (in the order from the object side)

$\phi_1$ and $\phi_2$: refractive powers of the first and second lens components $\phi_{(45)}$ and $\phi_{(67)}$ values defined by the following formulae:

$$\phi_{(k)} = (n_{k+1} - n_k)\frac{1}{r_k},$$

$$\phi_{(k,k+1)} = \phi_{(k)} + \phi_{(k+1)} - \frac{d_k}{n_{k+1}}\phi_k \cdot \phi_{k+1}$$

$(k = 1, 2 \ldots 9)$

Of the conditions mentioned above, the conditions (1) and (2) define refractive powers of the first and second lens components so as to shorten total length of the lens system and prevent various aberrations from being aggravated.

If $\phi_1 + \phi_2$ is smaller than 1.86 in the condition (1), it will be impossible to minimize telephoto ratio. If $\phi_1 + \phi_2$ is larger than 2.01, in contrast, it will be effective for designing a compact lens system but spherical aberration produced by the first and second lens component will be undercorrected. In order to correct this spherical aberration, it will be required to impart a large refractive power to the object side surface $r_5$ of the third lens component. In such a case, however, astigmatism and coma will be aggravated by the air lens between the second and third lens components (the airspace between the surfaces $r_4$ and $r_5$ serving just like a concave lens element). If $\phi_1$ is smaller than 0.60 in the condition (2), total length of the lens system is unavoidably prolonged, making it impossible to design a compact lens system. It is desirable that $\phi_1$ be as large as possible to design a compact lens system. If $\phi_1$ is larger than 0.86, however, spherical aberration produced by the first lens component will be undercorrected and cannot be corrected favorably even by enhancing refractive index of the first lens component.

The condition (3) is required for preventing spherical aberration from being aggravated by the first lens component. Describing in details, it is necessary to give a large value to $\phi_1$ for designing a compact lens system as already explained above, and it is additionally required to select a refractive index $n_2$ larger than 1.75 for the first lens component in order to prevent various aberrations from being aggravated when a large value is selected for $\phi_1$. If $n_2$ is smaller than 1.75, radius of curvature on the object side surface of the first lens component will be minimized for selecting a large value for $\phi_1$ and spherical aberration will be remarkably undercorrected. In order to correct the spherical aberration favorably, it will be necessary to weaken refractive power of the second lens component and enhance refractive power of the air lens having diverging function between the second and third lens components. However, either of these measures will increase astigmatic difference, thereby making it difficult to design a lens system having a wide field angle. In contrast to a Tesser type lens system comprising a cemented lens component having a convex surface on the object side, the lens system according to the present invention comprises a fourth lens component having a radius of curvature $r_8<0$ on a cemented surface which is effective for keeping good symmetry of rays as defined in the condition (4). Especially in a behind-stop type lens system, light intensity is largely different between the upper and lower pencils of the rays to be incident on the marginal portion of the image plane, and therefore, it is desirable that the surface $r_8$ be concave toward the intersecting point between the marginal rays and the optical axis in order to keep symmetry with regard to the whole pencil, whereby it becomes possible to prevent coma and astigmatic difference. If $r_8$ is larger than 0 in the condition (4), asymmetry of coma and astigmatic difference will be aggravated.

The condition (5) is required to properly balance refractive powers between the air lenses on both sides of the third lens component (i.e., the air lens formed by the surfaces $r_4$ and $r_5$ as well as that formed by the surfaces $r_5$ and $r_6$), thereby minimizing astigmatism and coma in these air lenses. In case of a Tesser type lens system, astigmatic difference and coma are aggravated most in the air lenses on both sides of a negative lens component, and it is therefore important for correcting the above-mentioned aberrations to properly distribute refractive powers between these air lenses. It is therefore necessary to select $\phi_{(45)}$ and $\phi_{(67)}$ so as satisfy the condition (5), $\phi_{(45)}$ and $\phi_{(67)}$ being determinable by the formulae given below:

$$\phi_{(45)} = \phi_{(4)} + \phi_{(5)} - \frac{d_4}{n_5} \phi_{(4)} \cdot \phi_{(5)}$$

$$= (1 - n_4)\frac{1}{r_4} + (n_6 - 1)\frac{1}{r_5} - d_4(1 - n_4)(n_6 - 1)\frac{1}{r_4 r_5}$$

$$\phi_{(67)} = \phi_{(6)} + \phi_{(7)} - \frac{d_6}{n_7} \phi_{(6)}\phi_{(7)}$$

$$= (1 - n_6)\frac{1}{r_6} + (n_8 - 1)\frac{1}{r_7} - d_6(1 - n_6)(n_8 - 1)\frac{1}{r_6 r_7}$$

If $\phi_{(67)}/\phi_{(45)}$ is larger than 1.9 in the condition (5), $\phi_{(67)}$ will have a large value and the air lens formed by the surfaces $r_6$ and $r_7$ will be strongly convex, whereby especially the principal pencil passing through the high portion and lower pencil of the offaxial rays of the third lens component will be largely refracted dwonward on the surface $r_6$ as compared with the upper pencil passing through the low portion, resulting in aggravation of coma. If $\phi_{(67)}/\phi_{(45)}$ is smaller than 1.4, in contrast, the air lens between the surfaces $r_4$ and $r_5$ will be strongly convex, whereby the offaxial rays will pass through high portion of this air lens and angle of incidence will be large, resulting in aggravation of astigmatic difference.

DETAILED DESCRIPTION OF THE PREFERRED EMBODIMENTS

Now, some preferred embodiments of the present invention will be described detailedly with reference to the accompanying drawings:

Emobidment 1

$r_1 = 0.3607$
$r_2 = 0.4748$
$r_3 = 0.3488$
$r_4 = 0.8837$
$r_5 = 9.4861$
$r_6 = 0.2652$
$r_7 = 0.8193$
$r_8 = -0.3572$
$r_9 = 58.7836$ $d_1 = 0.0454$, $n_1 = 1$
$d_2 = 0.0034$, $n_2 = 1.804$, $\nu_2 = 46.6$
$d_3 = 0.0680$, $n_3 = 1$
$d_4 = 0.0214$, $n_4 = 1.72916$, $\nu_4 = 54.7$
$d_5 = 0.0340$, $n_5 = 1$
$d_6 = 0.0611$, $n_6 = 1.68893$, $\nu_6 = 31.1$
$d_7 = 0.0997$, $n_7 = 1$
$d_8 = 0.0240$, $n_8 = 1.72916$, $\nu_8 = 54.7$
$n_9 = 1.51633$, $\nu_9 = 64.2$ $f = 1$, $\phi_1 = 0.631$, $\phi_2 = 1.332$
$\phi_{(45)} = -0.898$, $\phi_{(67)} = -1.567$ Embodiment 2

$r_1 = 0.3397$
$r_2 = 0.5065$
$r_3 = 0.3567$
$r_4 = 0.7743$
$r_5 = 43.1401$
$r_6 = 0.2580$
$r_7 = 0.9574$
$r_8 = -0.3942$
$r_9 = -12.7838$ $d_1 = 0.0531$, $n_1 = 1$
$d_2 = 0.0015$, $n_2 = 1.7725$, $\nu_2 = 49.6$
$d_3 = 0.0555$, $n_3 = 1$
$d_4 = 0.0209$, $n_4 = 1.72916$, $\nu_4 = 54.7$
$d_5 = 0.0252$, $n_5 = 1$
$d_6 = 0.0641$, $n_6 = 1.6668$, $\nu_6 = 33.0$
$d_7 = 0.1083$, $n_7 = 1$
$d_8 = 0.0173$, $n_8 = 1.72916$, $\nu_8 = 54.7$
$n_9 = 1.51112$, $\nu_9 = 60.5$ $f = 1$, $\phi_1 = 0.847$, $\phi_2 = 1.157$
$\phi_{(45)} = -0.920$, $\phi_{(67)} = -1.698$ Embodiment 3

$r_1 = 0.3467$
$r_2 = 0.4685$
$r_3 = 0.3674$
$r_4 = 0.8693$
$r_5 = -3.7715$
$r_6 = 0.2767$
$r_7 = 0.9024$
$r_8 = -0.3695$
$r_9 = -4.0819$ $d_1 = 0.0483$, $n_1 = 1$
$d_2 = 0.0033$, $n_2 = 1.7725$, $\nu_2 = 49.6$
$d_3 = 0.0623$, $n_3 = 1$
$d_4 = 0.0229$, $n_4 = 1.72916$, $\nu_4 = 54.7$
$d_5 = 0.0307$, $n_5 = 1$
$d_6 = 0.0565$, $n_6 = 1.6668$, $\nu_6 = 33.0$
$d_7 = 0.0863$, $n_7 = 1$
$d_8 = 0.0200$, $n_8 = 1.72916$, $\nu_8 = 54.7$
$n_9 = 1.51112$, $\nu_9 = 60.5$ $f = 1$, $\phi = 0.678$, $\phi_2 = 1.208$
$\phi_{(45)} = -1.018$, $\phi_{(67)} = -1.493$ wherein the reference symbol f represents focal length of the lens system as a whole, the reference symbols $r_1$ through $r_9$ designate radii of curvature on the surfaces of the respective lens elements, the reference symbols $d_1$ through $d_6$ denote thicknesses of the respective lens elements and airspaces therebetween, the reference symbols $n_1$ through $n_9$ represent refractive indices of the respective lens elements and airspaces therebetween, and the reference symbols $\nu_1$ through $\nu_9$ designate Abbe's numbers of the respective lens elements, said refractive indices being defined for the lens elements and airspaces in the order consecutively from the object side taking refractive index of air as 1.

Figure 1:
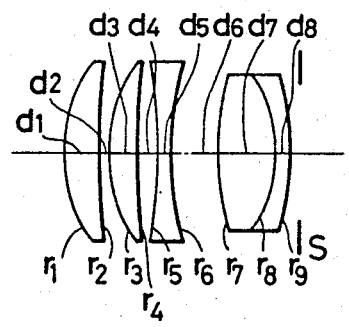
FIG. 1 shows a sectional view illustrating the composition of the lens system according to the present invention.
Figure 2:
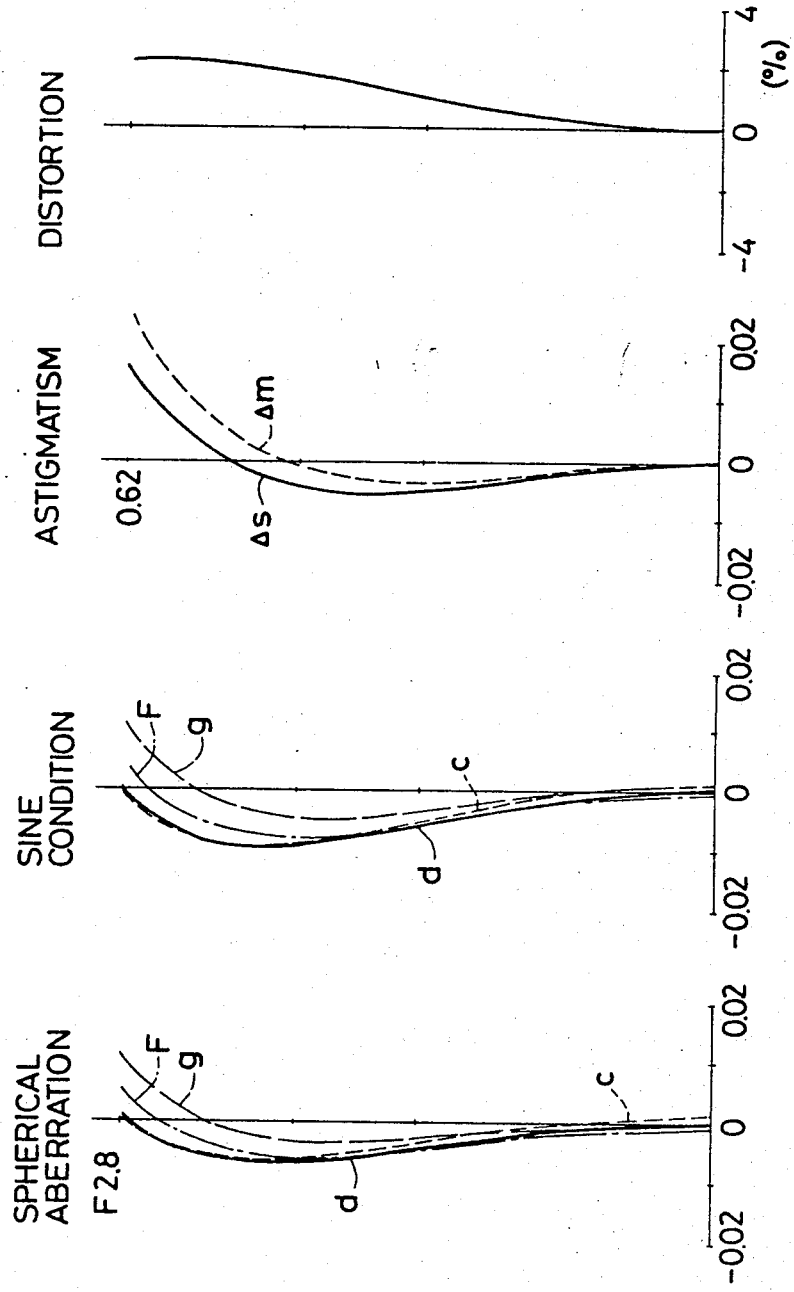
FIG. 2 shows curves illustrating the aberration characteristics of the Embodiment 1.
Figure 3:
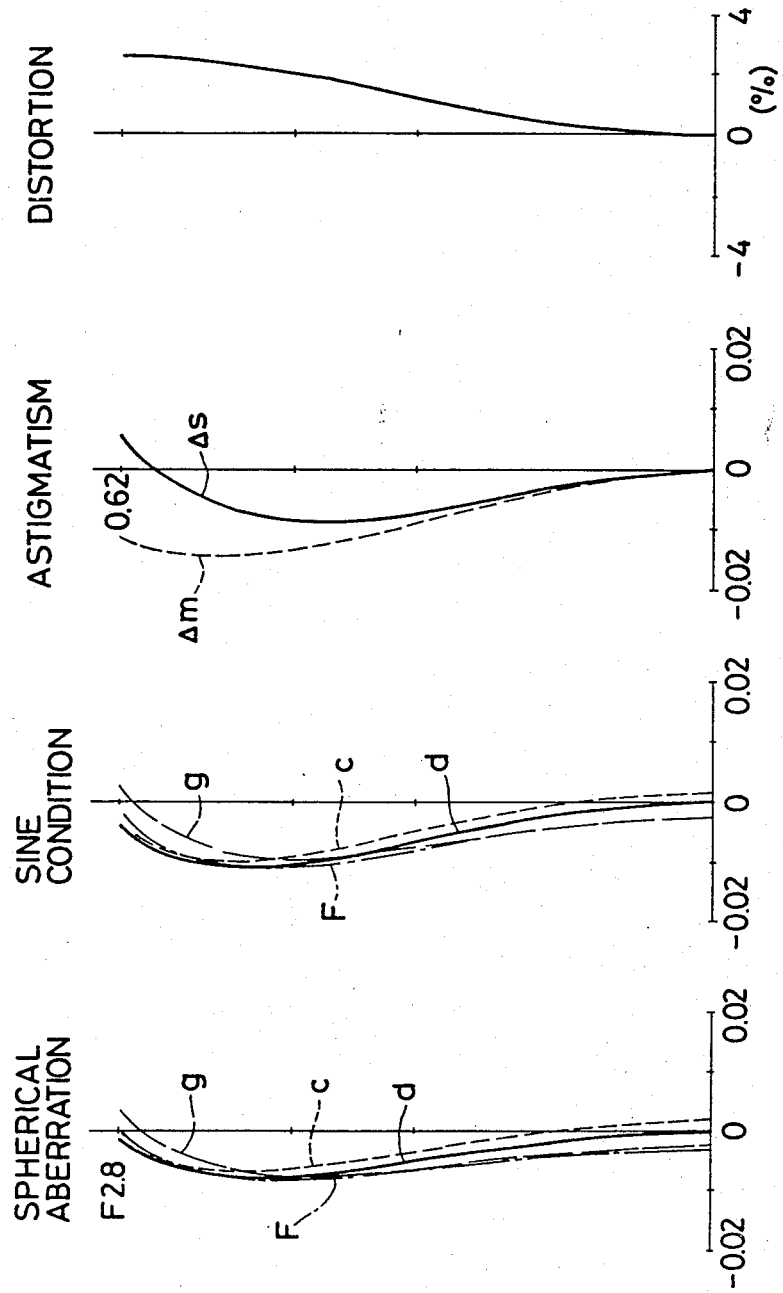
FIG. 3 illustrates curves visualizing the aberration characteristics of the Embodiment 2.
Figure 4:
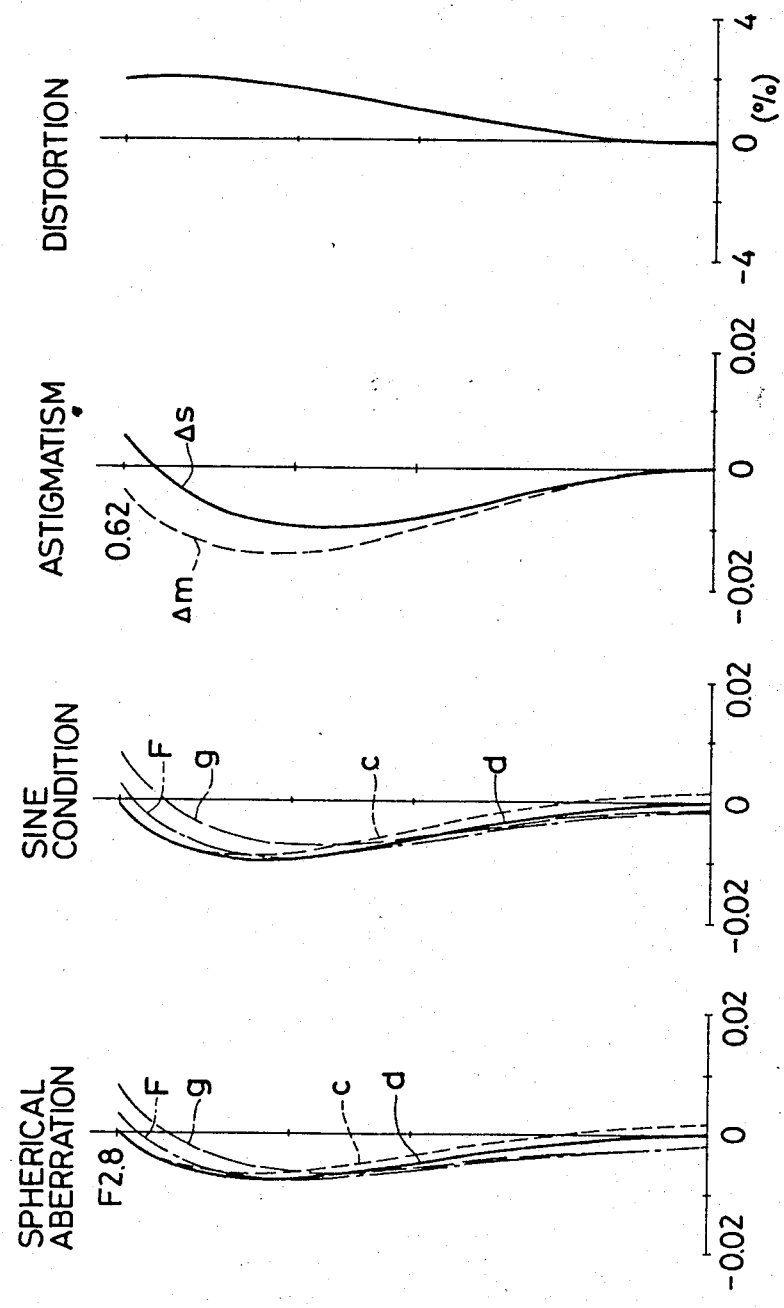
FIG. 4 illustrates graphs visualizing the aberration characteristics of the Embodiment 3.

The aberration characteristics of the Embodiments 1 through 3 are visualized in FIG. 2 through FIG. 4 respectively.

As is understood from the foregoing descriptions and drawings illustrating the embodiments, the lens system according to the present invention is a very compact photographic camera lens systems comprising a behind stop which has a relatively wide field angle of 60° and wherein various aberrations are favorably corrected. Compared in the table shown below are telephoto ratio (m) and ratio (k) of total length relative to the maximum height between the lens systems disclosed by the published examined applications mentioned at the beginning and that according to the present invention.

TABLE

|  | m | k |
|---|---|---|
| Japanese Published Examined Patent Application No. 15462/1966 | 1.205 | 2.267 |
| Japanese Published Examined Patent Application No. 266670/1971 |  |  |
| Embodiment 1 | 1.056 | 2.751 |
| Embodiment 2 | 1.055 | 1.983 |
| Present Invention | 1.079 | 1.75 |

In contrast to the two conventional lens systems designed for a field angle narrower than 56°, the lens system according to the present invention has a large field angle of 60°. Further, it is deemed that these two conventional lens systems comprises stops which are arranged inside said lens systems. Contrastingly, the lens system according to the present invention is designed for a telephoto ratio similar to that of the conventional lens system as shown in the above table in spite of the fact that it is of the behind stop type which can hardly be designed as a compact and desirable lens system. Further, ratio (k) of total length relative to maximum height is compared in the table since it is considered improper to judge compactness of lens system having different field angles by comparing telephoto ratios. The lens system according to the present invention is very compact as is clear from the data shown in the above table.

I claim:

1. A photographic camera lens system having a short total length comprising a first positive meniscus lens component, a second positive meniscus lens component, a third negative lens component and a fourth cemented lens component consisting of a biconvex lens element and a negative lens element, and said lens system satisfying the following conditions:

$1.86 \leq \phi_1 + \phi_2 \leq 2.01$ (1)

$0.60 \leq \phi_1 \leq 0.86$ (2)

$1.77 \leq n_2 \leq 1.81$ (3)

$-0.40f \leq r_8 23 -0.35f$ (4)

$1.4 \leq \phi_{(67)}/\phi_{(45)} \leq 1.9$ (5)

wherein the reference symbols $r_1$ through $r_9$ represent radii of curvature on the surfaces of the respective lens elements, the reference symbols $d_1$ through $d_8$ designate thicknesses of the respective lens elements and airspaces therebetween, the reference symbols $n_1$ through $n_9$ denote refractive indices of the lens elements and airspaces therebetween, the reference symbols $\phi_1$ and $\phi_2$ represent refractive powers of the first and second lens components, reference symbols $\phi_{(45)}$ and $\phi_{(67)}$ represent values which are defined by the following formulae:

$$\phi_{(k)} = (n_{k+1} - n_k)\frac{1}{r_k},$$

$$\phi_{(k,k+1)} = \phi_{(k)} + \phi_{(k+1)} - \frac{d_k}{n_{k+1}} \phi_{(k)} \cdot \phi_{(k+1)}$$

$$k = (1,2 \ldots 9)$$

2. A photographic camera lens system according to claim 1 having the following numerical data:

| | $n_1 = 1$ | |
|---|---|---|
| $r_1 = 0.3607$ | | |
| $d_1 = 0.0454$ | $n_2 = 1.804$ | $\nu_2 = 46.6$ |
| $r_2 = 0.4748$ | | |
| $d_2 = 0.0034$ | $n_3 = 1$ | |
| $r_3 = 0.3488$ | | |
| $d_3 = 0.0680$ | $n_4 = 1.72916$ | $\nu_4 = 54.7$ |
| $r_4 = 0.8837$ | | |
| $d_4 = 0.0214$ | $n_5 = 1$ | |
| $r_5 = -9.4861$ | | |
| $d_5 = 0.0340$ | $n_6 = 1.68893$ | $\nu_6 = 31.1$ |
| $r_6 = 0.2652$ | | |
| $d_6 = 0.0611$ | $n_7 = 1$ | |
| $r_7 = 0.8193$ | | |
| $d_7 = 0.0997$ | $n_8 = 1.72916$ | $\nu_8 = 54.7$ |
| $r_8 = -0.3572$ | | |
| $d_8 = 0.0240$ | $n_9 = 1.51633$ | $\nu_9 = 64.2$ |
| $r_9 = 58.7836$ | | |
| $f = 1, \phi_1 = 0.631, \phi_2 = 1.332$ | | |
| $\phi_{(45)} = -0.898, \phi_{(67)} = -1.567$ | | | wherein the reference symbol f represetns focal length of the lens system as a whole, the reference symbols $\nu_1$ through $\nu_9$ designate radii of curvature on the surfaces of the respective lens elements, the reference symbols $d_1$ through $d_6$ denote thicknesses of the respective lens elements and airspaces therebetween, the reference symbols $n_1$ through $n_9$ represent refractive indices of the respective lens elements and airspaces therebetween, and the reference symbols $\nu_1$ through $\nu_9$ designate Abbe's numbers of the respective lens elements, said refractive indices being defined for the lens elements and airspaces in the order consecutively from the object side taking refractive index of air as 1, reference symbols $\phi_1$, $\phi_2$, $\phi_{(45)}$, $\phi_{(67)}$ represent values defined by the following formulae:

$$\phi_k = (n_{k+1} - n_k)\frac{1}{r_k},$$

$$\phi_{(k,k+1)} = \phi_k + \phi_{k+1} - \frac{d_k}{\phi_{k+1}} \phi_k \cdot \phi_{k+1}$$

$$(k = 1,2 \ldots 9)$$

3. A photographic camera lens system according to claim 1 having the following numerical data:

| | $n_1 = 1$ | |
|---|---|---|
| $r_1 = 0.3397$ | | |
| $d_1 = 0.0531$ | $n_2 = 1.7725$ | $\nu_2 = 49.6$ |
| $r_2 = 0.5065$ | | |

-continued

|  |  |  |
|---|---|---|
| $d_2 = 0.0015$ | $n_3 = 1$ | |
| $r_3 = 0.3567$ | | |
| $d_3 = 0.0555$ | $n_4 = 1.72916$ | $\nu_4 = 54.7$ |
| $r_4 = 0.7743$ | | |
| $d_4 = 0.0209$ | $n_5 = 1$ | |
| $r_5 = 43.1401$ | | |
| $d_5 = 0.0252$ | $n_6 = 1.6668$ | $\nu_6 = 33.0$ |
| $r_6 = 0.2580$ | | |
| $d_6 = 0.0641$ | $n_7 = 1$ | |
| $r_7 = 0.9574$ | | |
| $d_7 = 0.1083$ | $n_8 = 1.72916$ | $\nu_8 = 54.7$ |
| $r_8 = -0.3942$ | | |
| $d_8 = 0.0173$ | $n_9 = 1.51112$ | $\nu_9 = 60.5$ |
| $r_9 = -12.7838$ | | |
| $f = 1, \phi_1 = 0.847, \phi_2 = 1.157$ | | |
| $\phi_{(45)} = -0.920, \phi_{(67)} = -1.698$ | | | wherein the reference symbol f represetns focal length of the lens system as a whole, the reference symbols $r_1$ through $r_9$ designate radii of curvature on the surfaces of the respective lens elements, the reference symbols $d_1$ through $d_6$ denote thicknesses of the respective lens elements and airspaces therebetween, the reference symbols $n_1$ through $n_9$ represent refractive indices of the respective lens elements and airspaces therebetween, and the reference symbols $\nu_1$ through $\nu_9$ designate Abbe's numbers of the respective lens elements, said refractive indices being defined for the lens elements and airspaces in the order consecutively from the object side taking refractive index of air as 1, reference symbols $\phi_1$, $\phi_2$, $\phi_{(45)}$, $\phi_{(67)}$ represent values defined by the following formulae:

$$\phi_k = (n_{k+1} - n_k)\frac{1}{r_k},$$

$$\phi_{(k, k+1)} = \phi_k + \phi_{k+1} - \frac{d_k}{\phi_{k+1}} \phi_k \cdot \phi_{k+1}$$

$$(k = 1.2 \ldots 9)$$

4. A photographic camera lens system according to claim 1 having the following numerical data:

|  |  |  |
|---|---|---|
| | $n_1 = 1$ | |
| $r_1 = 0.3467$ | | |
| $d_1 = 0.0483$ | $n_2 = 1.7725$ | $\nu_2 = 49.6$ |
| $r_2 = 0.4685$ | | |
| $d_2 = 0.0033$ | $n_3 = 1$ | |
| $r_3 = 0.3674$ | | |
| $d_3 = 0.0623$ | $n_4 = 1.72916$ | $\nu_4 = 54.7$ |
| $r_4 = 0.8693$ | | |
| $d_4 = 0.0229$ | $n_5 = 1$ | |
| $r_5 = -3.7715$ | | |
| $d_5 = 0.0307$ | $n_6 = 1.6668$ | $\nu_6 = 33.0$ |
| $r_6 = 0.2767$ | | |
| $d_6 = 0.0565$ | $n_7 = 1$ | |
| $r_7 = 0.9024$ | | |
| $d_7 = 0.0863$ | $n_8 = 1.72916$ | $\nu_8 = 54.7$ |
| $r_8 = -0.3695$ | | |
| $d_8 = 0.0200$ | $n_9 = 51112$ | $\nu_9 = 60.5$ |
| $r_9 = -4.0819$ | | |
| $f = 1, \phi_1 = 0.678, \phi_2 = 1.208$ | | |
| $\phi_{(45)} = -1.018, \phi_{(67)} = -1.493$ | | | wherein the reference symbol f represents focal length of the lens system as a whole, the reference symbols $r_1$ through $r_9$ designate radii of curvature on the surfaces of the respective lens elements, the reference symbols $d_1$ through $d_6$ denote thicknesses of the respective lens elements and airspaces therebetween, the reference symbols $n_1$ through $n_9$ represent refractive indices of the respective lens elements and airspaces therebetween, and the reference symbols $\nu_1$ through $\nu_9$ designate Abbe's numbers of the respective lens elements, said refractive indices being defined for the lens elements and airspaces in the order consecutively from the object side taking refractive index of air as 1, reference symbols $\phi_1$, $\phi_2$, $\phi_{(45)}$, $\phi_{(67)}$ represent values defined by the following formulae:

$$\phi_k = (n_{k+1} - n_k)\frac{1}{r_k},$$

$$\phi_{(k, k+1)} = \phi_k + \phi_{k+1} - \frac{d_k}{\phi_{k+1}} \phi_k \cdot \phi_{k+1}$$

$$(k = 1.2 \ldots 9)$$

* * * * *